US006592779B1

(12) United States Patent
Burns et al.

(10) Patent No.: US 6,592,779 B1
(45) Date of Patent: *Jul. 15, 2003

(54) COMPOSITION AND METHOD FOR ACID GAS TREATMENT

(75) Inventors: David Burns, The Woodlands, TX (US); Rickey Epps, Houston, TX (US)

(73) Assignee: Union Carbide Chemicals & Plastics Technology Corporation, Danbury, CT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 625 days.

(21) Appl. No.: 08/543,842

(22) Filed: Oct. 23, 1995

(51) Int. Cl.$^7$ .................... C09K 3/00; C01B 17/16; C01B 31/20
(52) U.S. Cl. ............. 252/190; 252/189; 252/364; 423/220; 423/226
(58) Field of Search .............. 208/47, 48 AA; 252/189, 396, 364, 190, 170; 422/4; 423/220, 226; 510/413

(56) References Cited

U.S. PATENT DOCUMENTS

| | | | |
|---|---|---|---|
| 2,649,166 A | | 8/1953 | Porter et al. ............ 183/115 |
| 3,362,133 A | | 1/1968 | Kutsher et al. ............ 55/44 |
| 3,594,985 A | | 7/1971 | Ameen et al. ............ 55/44 |
| 3,737,392 A | * | 6/1973 | Ameen et al. ............ 252/364 |
| 3,824,766 A | | 7/1974 | Valentine et al. .......... 55/48 |
| 3,837,143 A | | 9/1974 | Sutherland et al. ........ 55/32 |
| 4,044,100 A | * | 8/1977 | McElroy, Jr. ............ 423/226 |
| 4,581,154 A | * | 4/1986 | Kutsher et al. .......... 252/170 |
| 4,741,745 A | * | 5/1988 | Kadono et al. ............ 55/43 |
| 4,946,620 A | | 8/1990 | Kadono et al. .......... 252/190 |
| 4,962,238 A | * | 10/1990 | Wolfe et al. |
| 4,976,935 A | * | 12/1990 | Lynn .................... 423/222 |
| 4,995,888 A | * | 2/1991 | Beaupre et al. ............ 55/16 |
| 5,273,679 A | * | 12/1993 | Hihara et al. ............ 95/177 |

FOREIGN PATENT DOCUMENTS

EP    0 456 877 A1    11/1991

* cited by examiner

Primary Examiner—Joseph D. Anthony

(57) ABSTRACT

An improved composition and method for acid gas treatment, comprising an effective amount of tetraethylene glycol dimethyl ether, optionally in combination with other alkyl ethers of alkylene glycols. Utilization of a predominance of tetraethylene glycol dimethyl ether produces significant benefits in carbon dioxide slip in, e.g., ammonia systhesis plants. A solvent based predominantly on tetraethylene glycol dimethyl ether can be used neat or can be added to the existing recirculating solvent stream to increase the concentration of tetraethylene glycol dimethyl ether to a satisfactory level.

9 Claims, No Drawings

COMPOSITION AND METHOD FOR ACID GAS TREATMENT

BACKGROUND OF THE INVENTION

Dialkyl ethers of polyalkylene glycols are well known in the gas treatment art as solvents for acidic gases such as carbon dioxide ($CO_2$), hydrogen sulfide (H2S), carbonyl sulfides (COS), carbon disulfide ($CS_2$), mercaptans, and the like. Typical of the numerous disclosures of such solvents in the art are U.S. Pat. Nos. 3,737,392; 3,824,766; 3,837,143; 4,044,100; 4,581,154; 4,741,745; and 4,946,620, among others.

According to such references, it is well known that the dialkyl ethers of polyalkylene glycols, and in particular, for present purposes, the dimethyl ethers, comprise mixtures of polyalkylene adducts typically ranging from 1 to about 9 units of the ethylene oxide-derived moiety, —($C_2H_4O$)—. U.S. Pat. No. 4,581,154 is particularly informative in that regard. That reference discloses a bell curve distribution of —($C_2H_4O$)— homologs, with the peak at 50 weight percent of the 3-homolog and a maximum content of 40 weight percent of the 4-homolog. That reference further teaches that the most preferred composition, at least for low temperature use, has a distribution of the 3- and 4-homologs at 33 weight percent each.

While the compositions of the prior art are generally effective for their intended purpose, they are not optimal. More specifically, it would be desirable to have a gas treatment composition which provides an improved balance of volatility and viscosity, and also improves the removal vs. retention balance of at least one key acidic component of the gas being treated. The present invention responds to that need.

SUMMARY OF THE INVENTION

The present invention provides a solvent composition for removal of acidic gaseous impurities from gaseous streams bearing such impurities, comprising a mixture of dimethyl ethers of polyethylene glycols of the formula $CH_3O$($C_2H_4O)_x$ $CH_3$ wherein x is from about 3 to about 9 and wherein in at least about 50 weight percent of the total dimethyl ethers x equals 4. In a preferred embodiment, the present invention provides a composition for removal of acidic gaseous impurities from gaseous streams bearing such impurities, comprising a mixture of dimethyl ethers of polyethylene glycols of the formula $CH_3O(C_2H_4O)_xCH_3$ wherein x is from about 3 to about 6 and wherein in at least about 40 weight percent of the total dimethyl ethers x equals 4 and no more than about 15 weight percent of the total dimethyl ethers is a combination of the 3-mole ethoxylate and the 5-mole ethoxylate.

In addition, the present invention provides an improved method for treating acid gas containing at least some carbon dioxide with a solvent, comprising contacting in a contacting means (typically, an absorber) the acid gas with a solvent comprising a mixture of alkyl ethers of alkylene oxides including at least some of the 4-mole ethoxylate of dimethyl ether, wherein the improvement comprises increasing the concentration of the 4-mole ethoxylate of dimethyl ether by a sufficient amount to significantly reduce the amount of carbon dioxide exiting the contacting means. Moreover, the present invention provides a method for treating a gas stream containing acidic gases comprising contacting the gas stream with a circulating solvent stream comprising at least about 1% by weight of the solvent stream of the 4mole ethoxylate of dimethyl ether in the substantial absence of the 3-mole ethoxylate of dimethyl ether.

DESCRIPTION OF THE INVENTION

As used herein, the terms "gas," "acid gas," and the like, are intended to refer to natural gas, hydrocarbon gas, syngas, steam reformer-type gases, and any other gas containing acidic, gaseous components which are to be removed by treatment with a solvent. Also as used herein, the expression "substantial absence" is intended to refer to a concentration which has no commercially significant effect on the ability of the solvent mixture to remove carbon dioxide under the operating conditions being employed.

The present invention provides its improvement over the prior art by increasing the concentration of the 4-mole ethoxylate of dimethyl ether present in the solvent being used to treat an acid gas, particularly an acid gas containing carbon dioxide. As will be illustrated in the examples below, it has been unexpectedly found that the 4-mole ethoxylate of dimethyl ether is uniquely effective in retaining carbon dioxide, i.e., in reducing the amount of carbon dioxide exiting the contacting means. Accordingly, the present invention is particularly useful in commercial operations wherein the separation and recovery of carbon dioxide is economically advantageous and carbon dioxide "slip" is therefore desirably minimized. Such a commercial operation would include, for instance, an ammonia plant where carbon dioxide separated in the contactor can be flashed off from the alkyl ether alkoxylate solvent and recovered for sale, used for urea production, and the like.

In accordance with the present invention, it has been discovered that the pure 4-mole ethoxylate of dimethyl ether (i.e., tetraethylene glycol dimethyl ether) has excellent properties for the removal of acid gases, especially $CO_2$, from methane, natural gas, syngas and hydrocarbon gases in general. Its combination of excellent affinity for the acid gases, low viscosity and low vapor pressure, makes it superior to any of the other homologs in the series for use in acid gas treatment. By comparison, triethylene glycol dimethyl ether is relatively volatile (relatively high vapor pressure) and is therefore readily lost with the products exiting the acid gas contacting means. On the other hand, pentaethylene glycol dimethyl ether and higher homologs are undesirably viscous, resulting in various problems of reparation and recovery downstream of the contactor.

Although tetraethylene glycol dimethyl ether is particularly effective as a solvent when used alone, it will be recognized that well-known methods of preparation of dialkyl ethers of alkylene glycols do not ordinarily produce pure products, so as a matter of economic convenience, a certain amount of other homologs may be tolerated in combination with the tetraethylene glycol dimethyl ether. In any such combination, it is preferred that tetraethylene glycol dimethyl ether be present in a concentration of at least about 50% by weight, more preferably at least about 60%, and most preferably at least about 80% by weight.

It has been found particularly desirable to restrict the distribution of ethylene oxide homologs to the 3 to 6-mole adducts, such that the 4-mole adduct substantially predominates the composition. More specifically, it is desirable that the combined concentration of the 3-mole, 5-mole, and 6-mole ethoxylate homologs make up no more than about 15%, preferably no more than about 10%, by weight of the total dimethyl ether mixture. In particular, it is preferable that the 3-mole homolog make up no more than about 2%, more preferably no more that about 1%, by weight of the total dimethyl ether mixture.

For start-up of treatment facilities, it is desirable that a solvent as high in tetraethylene glycol dimethyl ether as possible be used. Alternatively, it is quite effective to add a solvent high in tetraethylene glycol dimethyl ether to the pre-existing solvent in operating facilities in order to raise the average concentration of tetraethylene glycol dimethyl ether. It is highly desirable to raise the circulating concentration of tetraethylene glycol dimethyl ether to at least about 50% by weight. Where the concentration of adjacent homologs has been restricted, as discussed above, a significant beneficial effect can be observed at concentrations of the 4-mole adduct at levels much below 50% by weight. Moreover, in the substantial absence of the 3-mole adduct, a beneficial effect can be seen at concentrations of the 4-mole adduct down to as low as about 1% by weight, although the concentration of the 4-mole adduct is preferably at least about 30%, and more preferably at least about 60% by weight of the soolvent mixture. In an ideal composition, up to 100% by weight of the solvent can be the tetraethylene glycol dimethyl ether. It has been found, however, that even relatively small increases in the concentration of tetraethylene glycol dimethyl ether are surprisingly effective in reducing the amount of $CO_2$ lost at the outlet of the contactor. Similarly, it has been surprisingly found that by increasing the concentration of circulating tetraethylene glycol dimethyl ether, the circulation rate can be substantially reduced while yet significantly reducing the amount of $CO_2$ being lost. These facts are illustrated in the examples below.

EXAMPLES

The following examples illustrate various applications of the invention, but are in no way intended to limit it.

The examples were run at two separate ammonia synthesis plants already using for acid gas treatment a commercially available solvent comprising a mixture of dimethyl ethers of polyethylene oxide having the following approximate composition by weight percent of the indicated ethoxylate homolog: 7% of 3-mole, 22% of 4-mole, 29% of 5-mole, 23% of 6-mole, and the remainder comprising the higher homologs. Its average molecular weight was about 270, and its average homolog number was 5.

In each case, inlet gas to be treated was introduced at the bottom of an absorber, and lean solvent was introduced at the top. The inlet gas comprised, on a molar basis, approximately 17% $CO_2$, 0.5% $CH_4$, 20% $N_2$, 0.2% CO, and 62% $H_2$. The solvent was intimately contacted with the upflowing gas as the solvent flowed down the absorber column. The acid gas-rich solvent left the bottom of the absorber and was allowed to flash at reduced pressure in a first flash tank. The gas flashed off in this first stage was recycled to the inlet gas to maximize the recovery of hydrogen and increase $CO_2$ purity in subsequent flash(es). The solvent leaving the first flash tank still contained most the absorbed $CO_2$, and was introduced into a second flash tank where essentially all of the $CO_2$ was flashed off and removed as product. The traces of $CO_2$ remaining in the solvent exiting the second flash tank were removed in a stripper column, where complete $CO_2$ removal was achieved by stripping the solvent with air. (It will be understood that the solvent may be reboiled when very high acid gas recovery is desired, or very lean solvent solution is desired to improve the gas specifications achieved.) The solvent, now very lean in $CO_2$, left the stripper at the bottom and was cooled and recycled to the top of the absorber.

Example 1

A composition of this invention was prepared having the following approximate composition by weight percent: 85% dimethyl ether of tetraethylene glycol, 1% dimethyl ether of triethylene glycol, 8% dimethyl ether of pentaethylene glycol, 3% dimethyl ether of hexaethylene glycol, 2% monomethyl ether of polyethylene glycol, and 1% water. This experimental composition was added to the circulating stream of commercial solvent in a proportion which produced the tetraethylene glycol dimethyl ether concentration shown in Run 2. (Run 1 is comparative; the concentration of tetraethylene glycol dimethyl ether is that resulting from the use of the commercial solvent itself.)

TABLE 1

| Solvent | Run 1 Commercial | Run 2 Comm'l + Exp.'l |
| --- | --- | --- |
| 4-mole homolog, Wt. % | 22 | 70 |
| Feed Gas Vol., MMSCFD | 23.9 | 23.9 |
| Inlet Gas Press., psig | 560 | 570 |
| Inlet $CO_2$ Conc., mole % | 17 | 17 |
| Outlet $CO_2$ Conc., mole % | 1.7 | 0.89 |
| Solvent Circ. Rate, gpm | 1008 | 868 |
| Lean Solvent Temp., ° F. | 39 | 34 |
| Rich Solvent Temp., ° F. | 52 | 50 |
| Flash #1 Temp., ° F. | 50.9 | 47.3 |
| Flash #1 Press., psig | 88 | 85 |
| Flash #2 Temp., ° F. | 45 | 43 |
| Flash #2 Press., psig | 1 | 1 |
| Stripper Air Flow, scfm | 840 | 820 |

It is particularly noteworthy that the outlet $CO_2$ concentration was reduced by nearly 50%, while the solvent circulation rate was also reduced by nearly 15%. It will be readily understood by those familiar with ammonia manufacture that the increased production of carbon dioxide represents a substantial increase in income, and that the lower circulation rate translates to a substantial saving in energy costs. If the solvent circulation were to be maintained constant and the gas throughput increased accordingly, the economic advantages would be significantly greater still.

Example 2

Although this test was performed at a different ammonia plant from that of Example 1, the relevant process was similar. Again, Run 1 was comparative, and in Run 2 a composition of this invention, as described in Example 1, was mixed into the pre-existing commercial solvent stream to produce the tetraethylene glycol dimethyl ether concentration shown.

TABLE 2

| Solvent | Run 1 Commercial | Run 2 Comm'l + Exp.'l |
| --- | --- | --- |
| 4-mole homolog, Wt. % | 19 | 23 |
| Feed Gas Vol., MMSCFD | 160 | 160 |
| Inlet Gas Press., psia | 465 | 463 |
| Inlet $CO_2$ Conc., mole % | 18 | 18 |
| Outlet $CO_2$ Conc., mole % | 0.407 | 0.336 |
| Solvent Circ. Rate, gpm | 7516 | 7476 |
| Lean Solvent Temp., ° F. | 36 | 32 |
| Rich Solvent Temp., ° F. | 48 | 45 |
| Flash #1 Press., psia | 92 | 90 |
| Flash #2 Press., psia | 7.3 | 6.6 |
| Stripper Air Flow, scfm | 17,015 | 15,914 |

It is noteworthy that increasing the circulating concentration of tetraethylene glycol dimethyl ether by merely 4 percentage points resulted in a very significant reduction of $CO_2$ loss.

We claim:

1. A solvent composition for removal of acidic gaseous impurities from natural gas, hydrocarbon gas, or syngas streams, consisting essentially of a mixture of dimethyl ethers of polyethylene glycols of the formula $CH_3O(C_2H_4O)_x CH_3$ wherein x is from about 3 to about 9 and wherein in at least about 50 weight percent of the total dimethyl ethers x equals 4 and no more than about 15 weight percent of the total dimethyl ethers is a combination of the 3-mole ethoxylate, the 5-mole ethoxylate, and the 6-mole ethoxylate.

2. A composition of claim 1 wherein in at least about 80 weight percent of the total dimethyl ethers x equals 4.

3. A composition of claim 1 wherein x is from about 3 to about 6.

4. A composition of claim 3 wherein in at least about 60 weight percent of the total dimethyl ethers x equals 4.

5. A composition of claim 3 wherein in at least about 80 weight percent of the total dimethyl ethers x equals 4.

6. A solvent composition for removal of acidic gaseous impurities from natural gas, hydrocarbon gas or syn gas streams, consisting essentially of at least two dimethyl ethers of polyethylene glycol of the formula $CH_3O(C_2H_4O)_x CH_3$, wherein X is from about 3 to 9 and wherein at least about 60 weight percent of the total of said at least two dimethyl ethers is the 4-mole ethoxylate, and no more than about 15 weight percent of the total dimethyl ethers is a combination of 3-mole ethoxylate, 5-mole ethoxylate, and 6-mole ethoxylate.

7. A composition for removal of acidic gaseous impurities from natural or hydrocarbon gas streams, consisting essentially of a mixture of dimethyl ethers of polyethylene glycols of the formula $CH_3O(C_2H_4O)_x CH_3$ wherein x is from about 3 to about 6 and wherein in at least about 85 weight percent of the total dimethyl ethers x equals 4 and no more than about 15 weight percent of the total dimethyl ethers is a combination of the 3-mole ethoxylate, the 5-mole ethoxylate, and the 6-mole ethoxylate.

8. A composition of claim 7 wherein no more that about 2 weight percent of the total dimethyl ethers is the 3-mole ethoxylate.

9. A composition of claim 8 wherein no more that about 1 weight percent of the total dimethyl ethers is the 3-mole ethoxylate.

* * * * *